United States Patent [19]

Eddleman

[11] Patent Number: 4,988,438
[45] Date of Patent: Jan. 29, 1991

[54] OIL SPILL CORRAL

[76] Inventor: Harold L. Eddleman, P.O. Box 1224, Newport, Oreg. 97365

[21] Appl. No.: 424,118

[22] Filed: Oct. 19, 1989

[51] Int. Cl.[5] .............................................. E02B 15/04
[52] U.S. Cl. ................................ 210/242.3; 210/923; 405/66; 405/68; 405/70
[58] Field of Search ...................... 210/242.3, 923, 776; 405/66, 68, 70

[56] References Cited

U.S. PATENT DOCUMENTS

| | | | |
|---|---|---|---|
| 3,184,923 | 5/1965 | Galvaing | 210/423 |
| 3,221,884 | 12/1965 | Muller | 210/242.3 |
| 3,369,664 | 2/1968 | Dahan | 210/242.3 |
| 3,576,108 | 4/1971 | Rowland | 405/70 |
| 3,584,462 | 7/1971 | Gadd | 210/242.3 |
| 3,666,089 | 5/1972 | Souza | 206/52 W |
| 3,925,991 | 12/1975 | Poche | 210/923 |
| 4,014,795 | 3/1977 | in'tVeld | 210/242.3 |
| 4,096,700 | 6/1978 | Muramatsu et al. | 210/242.3 |
| 4,174,186 | 11/1979 | Kasai et al. | 405/71 |
| 4,207,191 | 6/1980 | Webb | 210/242.3 |
| 4,295,755 | 10/1981 | Meyers | 405/66 |
| 4,310,415 | 1/1982 | Webb | 210/242.3 |

FOREIGN PATENT DOCUMENTS 1032121 6/1958 Fed. Rep. of Germany .
397591 1/1974 U.S.S.R. .

Primary Examiner—Richard V. Fisher
Assistant Examiner—Christopher Upton
Attorney, Agent, or Firm—Fleit, Jacobson, Cohn, Price, Holman & Stern

[57] ABSTRACT

A elongated accordion pleated member is provided and includes inner and outer longitudinal sides. The tubular member is composed of individually inflated buoyant side-by-side alternating continuous periphery and brokenn periphery frame-type members and each of the side-by-side members includes internal biasing means tending to bias the pleated tubular member toward an extended position, the broken periphery members opening outwardly of the inner longitudinal side of the tubular member and defining upper water layer and oil inlet openings opening into the interior of the tubular member.

14 Claims, 4 Drawing Sheets

Oil Spill

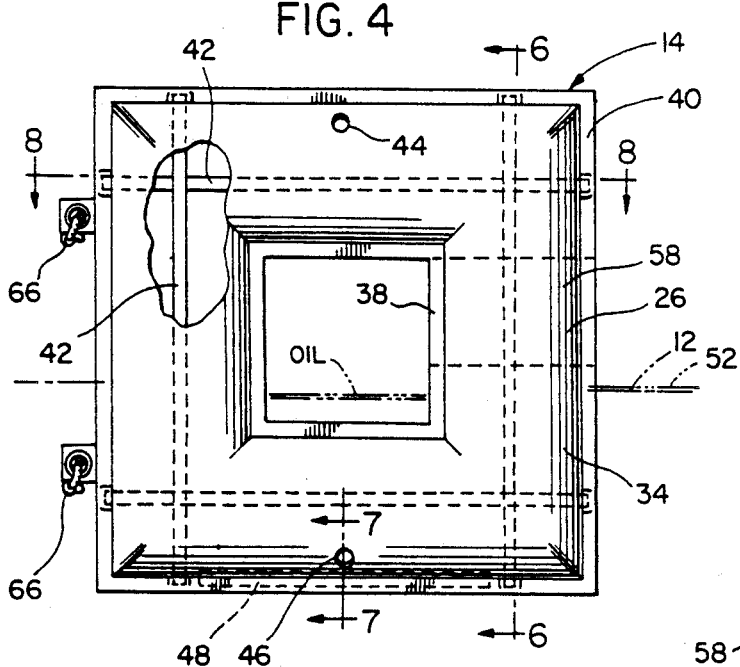
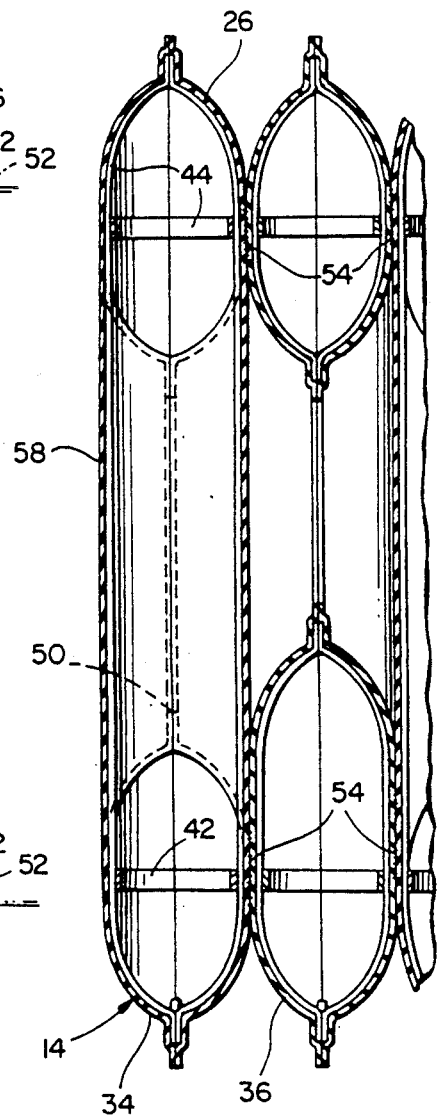
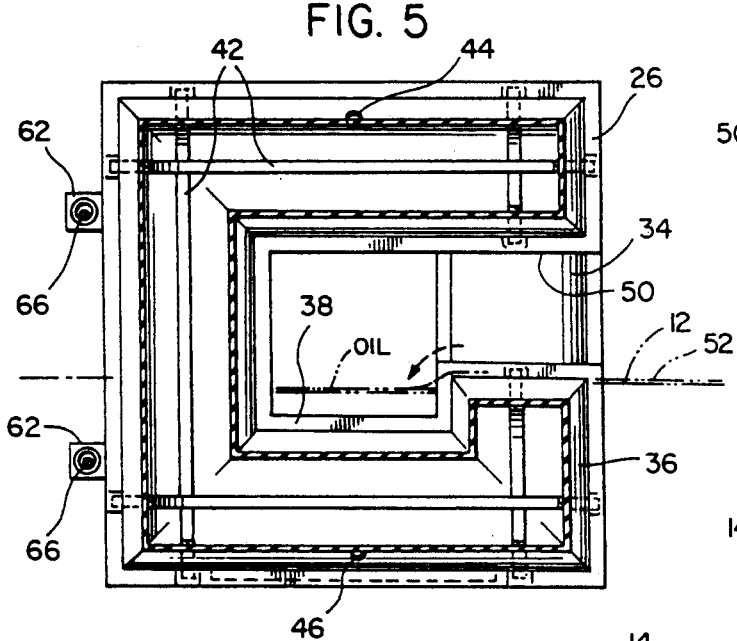
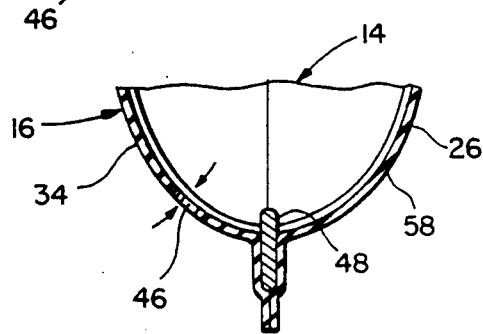

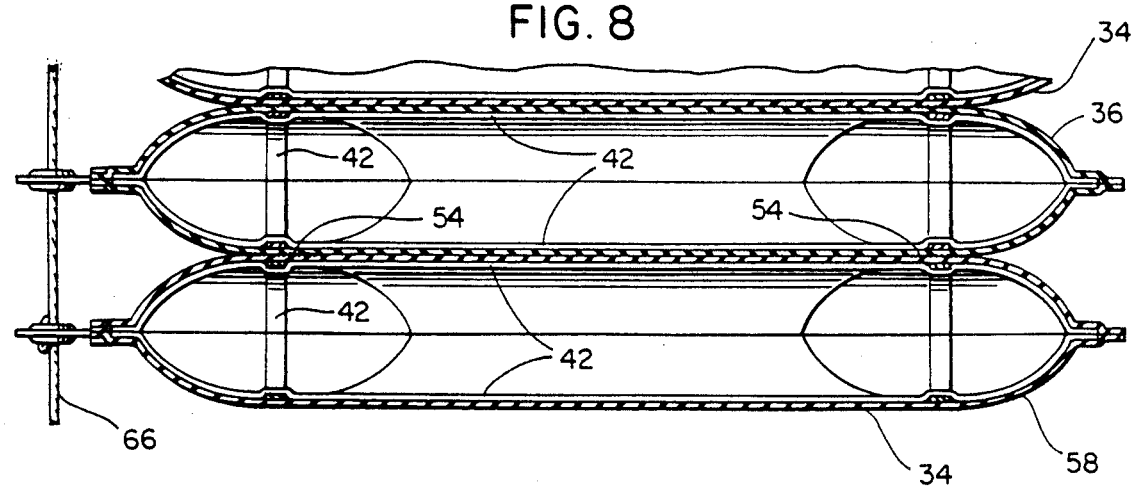
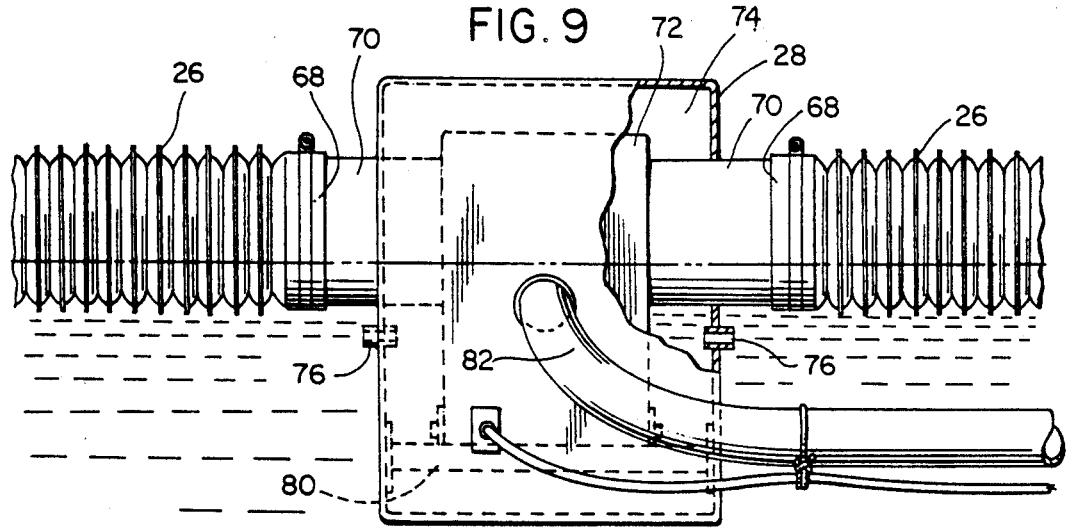
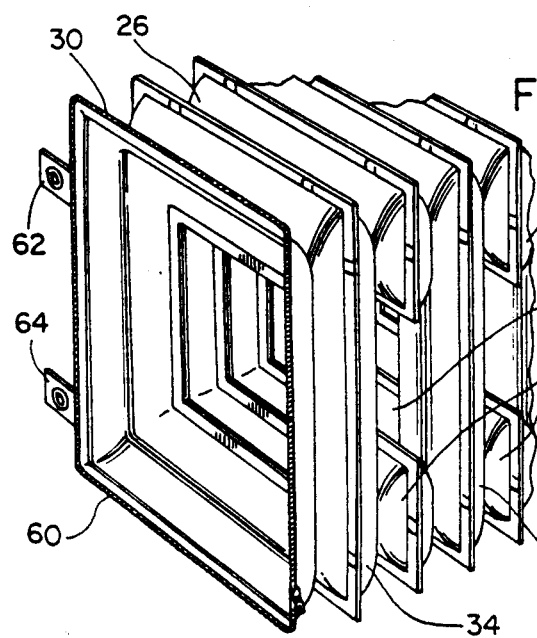
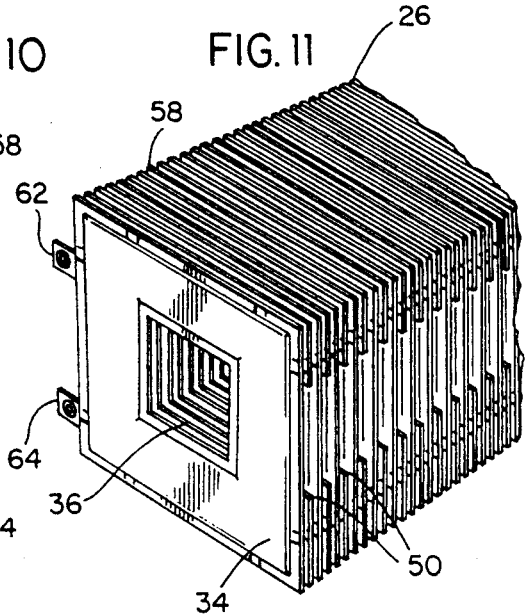

OIL SPILL CORRAL

BACKGROUND OF THE INVENTION

1. Field of the Invention

This invention relates to a elongated, flexible, tubular and buoyant boom or corral for extending at least partially about and containing, against further dispersion, an oil spill area on the surface of a body of water and the corral includes inner and outer longitudinal sides for opposing and facing away from, respectively, the oil spill area. The inner side of the boom includes longitudinally spaced openings for receiving the top layer of water and the oil floating thereon therethrough into the interior of the boom and buoyant sump housings are used to interconnect adjacent boom sections with adjacent ends of boom sections opening into the sump housings and lower portions of the sump housings including structure operatively associated therewith for pumping oil and water from the sump housings to a remote location.

2. Description of the Related Art

Various different forms of oil spill collecting and pumping structures including some of the general structural and operational features of the instant invention are disclosed in U.S. Pat. Nos. 3,184,923, 3,221,884, 3,369,664, 3,584,462, 3,666,089, 3,925,991, 4,014,795, 4,096,700, 4,174,186, 4,207,191 and 4,310,415. However, these previously known devices do not include the overall combination of structural features incorporated in the instant invention.

SUMMARY OF THE INVENTION

The oil spill corral of the instant invention comprises an elongated, tubular, buoyant, flexible and collapsible construction for floating on a body of water about an oil spill and including longitudinally spaced openings through which the upper surface of the water and oil floating thereon may enter into the interior of the tubular construction. Longitudinally spaced portions of the tubular construction include water and oil collection points from which collected oil and water may be pumped to remote locations and the interior of the tubular construction defines longitudinally spaced, transverse weirs for controlling the flow of water and oil longitudinally thereon when the tubular construction is floated on ocean waves or other body of water.

The main object of this invention is to provide an oil spill corral which will be capable of effectively skimming the upper water layer and oil floating thereon about the outer periphery of an oil spill.

Another object of this invention is to provide an oil spill corral in accordance with the preceding object and including structure by which the skimmed liquid may be transported to collection points therefore spaced longitudinally of the corral and subsequently pumped to remote locations.

Another important object of this invention is to provide a corral including internal structure which will control the flow of skimmed water and oil longitudinally through the corral to the longitudinally spaced collection points thereof.

A further object of this invention is to provide an oil spill corral which may be extended to great lengths and yet which may be collapsed after usage for compact storage and shipment.

Yet another object of this invention is to provide an oil spill corral whose construction, about the upper water layer and oil entrance openings thereof, facilitates the concentration of skimmed oil in relation to the total amount of combined oil and water entering into the interior of the corral.

A final object of this invention to be specifically enumerated herein is to provide an oil spill corral in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a vertical sectional view taken substantially upon the plane indicated by the section line 4—4 of FIG. 3 with a portion of the adjacent wall of the corral broken away to illustrate the internal springs thereof and also illustrating a check valve equipped upper air inlet opening and a lower water drain outlet opening of the corral;

FIG. 5 is a vertical sectional view taken substantially upon the plane indicated by the section line 5-5 of FIG. 3 and illustrating one of the upper water level and oil inlet openings of the corral as well as the internal spring structure of the corral;

FIG. 6 is an enlarged fragmentary vertical sectional view taken substantially upon the plane indicated by the section line 6—6 of FIG. 4;

FIG. 7 is an enlarged fragmentary vertical sectional view taken substantially upon the plane indicated by the section line 7—7 of FIG. 4;

FIG. 8 is an enlarged fragmentary horizontal sectional view taken substantially upon the plane section line 8—8 of FIG. 4;

FIG. 9 is a fragmentary elevational view illustrating the manner in which buoyant water and oil collection sump housings are utilized to connect adjacent corral sections, portions of the illustrated oil and water collection sump housing being broken away and illustrated in vertical section;

FIG. 10 is a fragmentary perspective view of one end portion of a corral section illustrating the slide fastener section thereof by which adjacent corral sections may be secured together; and FIG. 11 is a fragmentary perspective view illustrating the manner in which a corral section of considerable length may be collapsed in accordion fashion for compact storage.

DESCRIPTION OF THE PREFERRED EMBODIMENT

Figure 1:
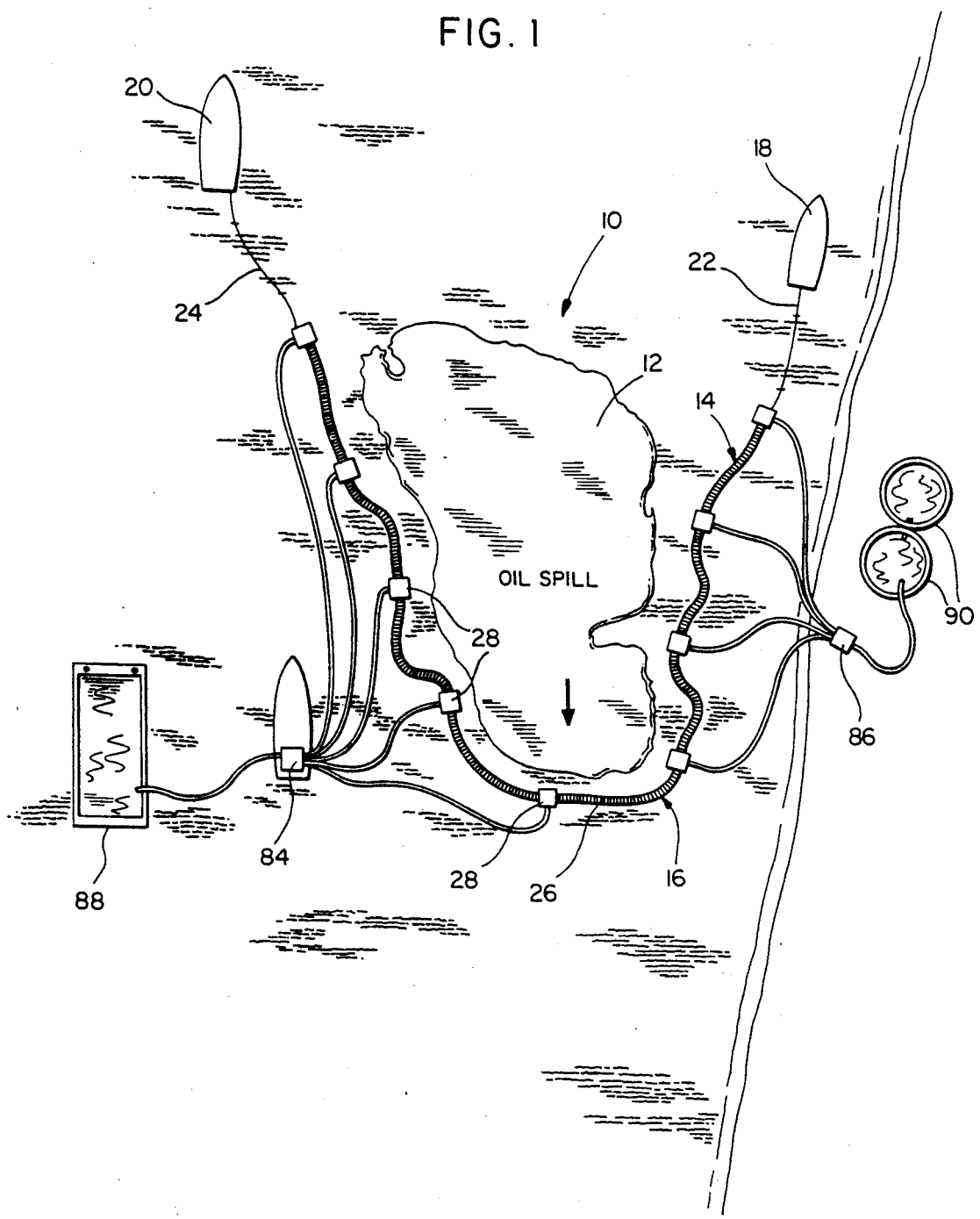
FIG. 1 is a plan view of the oil spill corral disposed partially about an oil spill and with the skimmed and oil and water sump housings of the corral having discharge hoses operatively associated therewith for pumping collected oil and water to remote storage areas.
Figure 2:
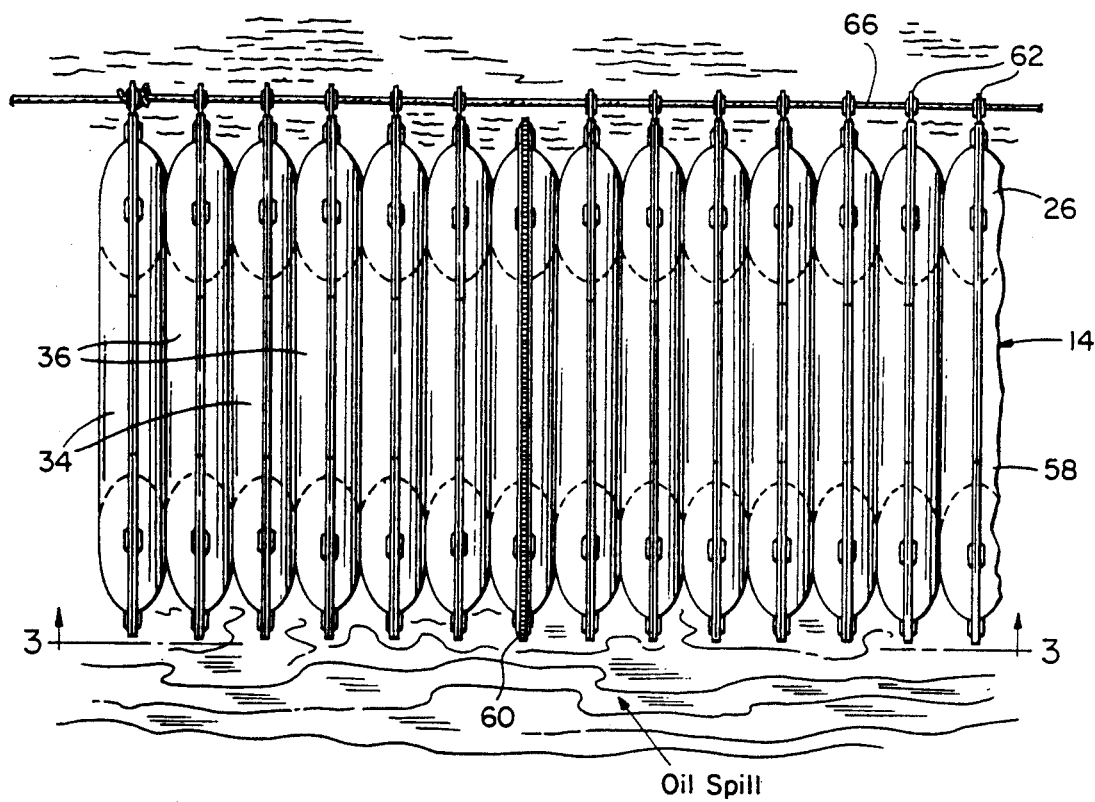
FIG. 2 is a fragmentary enlarged top plan view of the oil spill corral illustrating the manner in which longitudinally aligned ends of adjacent sections of the corral are removably secured together through the utilization of a slide fastener.
Figure 3:
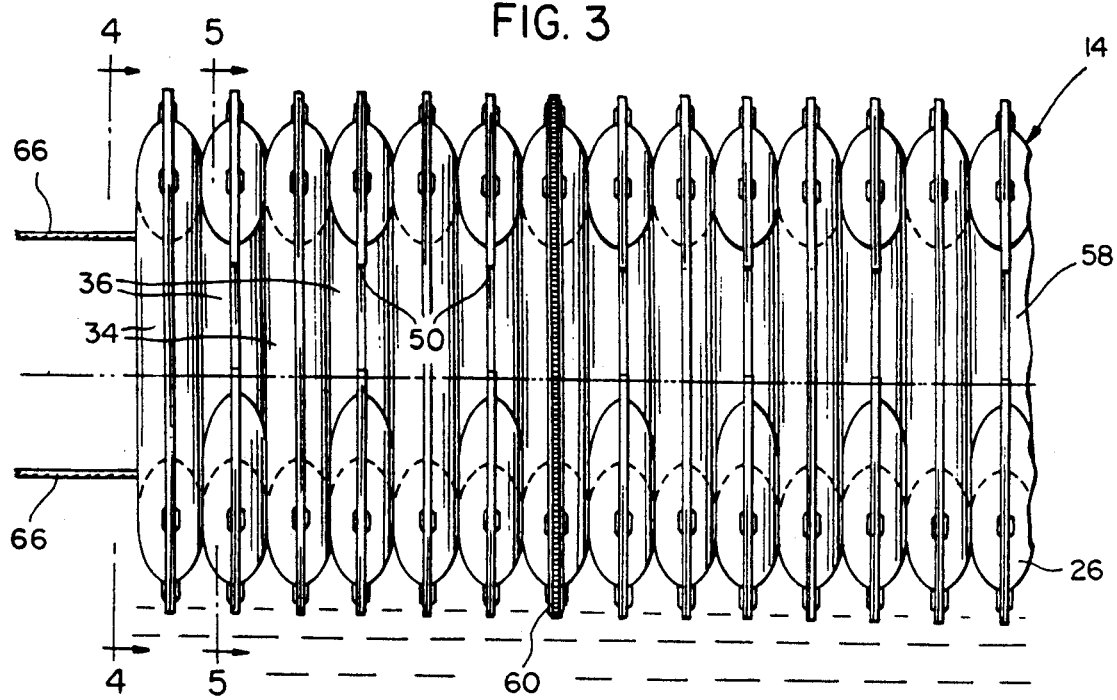
FIG. 3 is an elevational view of the assemblage illustrated in FIG. 2 as seen from the inner side of the oil spill corral and illustrating the upper water level and oil inlet openings thereof.

Referring now more specifically to the drawings the numeral 10 generally designates a body of water on whose upper surface an oil spill 12 is floating.

The oil spill corral of the instant invention is referred to in general by the reference numeral 14 and includes an elongated, horizontal and flexible tubular member referred to in general by the reference numeral 16. The corral 14 is buoyant, in a manner to be more fully hereinafter set forth, and floats on the body of water 10. Further, the opposite ends of the corral 14 are anchored to boats 18 and 20 through the utilization of tether lines 22 and 24 and the corral 14 extends at least partially about the oil spill 12.

The tubular member 16 includes a plurality of longitudinally aligned and adjacent end communicated sections 26. Some adjacent sections 26 are joined through the utilization of water and oil collection sump housings 28, but there may be provided a plurality of sections 26 between adjacent housings 28, in which case adjacent section ends are provided with co-acting slide fastener structure 30 for removably joining adjacent section ends together.

From FIGS. 4-7 and 10 of the drawings it may be seen that each section 26 includes alternating hollow, closed periphery members 34 and hollow G-shaped members 36, the members 34 and 36 being alternately spaced along each of the sections 26. However, if it is desired, two or more members 34 could be disposed between adjacent members 36 or two or more members 36 could be disposed between adjacent members 34, as desired.

The members 34 are closed continuously peripheral hollow members including sealed inner and outer peripheries 38 and 40 and each member 34 includes internal pairs of springs 42 which tend to yieldingly bias the members 34 toward inflated positions the upper portion of each member 34 including a flap check valve equipped air inlet opening 44 and a lower drain opening 46 as well as a lower horizontal weight bar 48.

The members 36 are similarly constructed, except that the inner side of each member 36 has an entranced throat 50 opening laterally through the member 36 to communicate the interior thereof with the exterior thereof, laterally of the associated section 26 and with the throat or opening 50 opening through the inner side of the corresponding section. The lower extremity of the throat or opening 50 in each member 36 is disposed in general horizontal alignment with the level 52 of the associated oil spill 12.

From FIG. 6 of the drawings in may be seen that the mid-portions of the members 34 and 36, mid way between the sealed inner and outer peripheries thereof, are joined together as at 54 in any convenient manner such as thermal welding, the members 34 and 36 being constructed of air impervious material such as plastic or rubber.

It is to be understood that each of the sections 26 may be composed a plurality of tubular member elements 58 each including a plurality of members 34 and 36 and with adjacent ends of tubular member elements 58 joined together through the utilization of a peripheral slide fastener such that designated at 60 in FIG. 10. Also, each of the members 34 and 36 includes upper and lower grommet equipped anchor tabs 62 and 64 on the outer side of the tubular member 16 and upper and lower lines or cables 66 extend through the grommets of the anchor tabs 62 and 64. Of course, the opposite ends of the lines or cables 66 extending the length of the corral 14 may be secured to the tether lines 22 and 24, if desired. Further, the adjacent ends of the adjacent sections 26 include tubular extensions 68 which are telescoped over and secured to tubular nipples 70 opening into the corresponding housing 28. The housings 28 include inner closed housings 72 into which the nipples 70 open and the spacing between the housings 28 and the inner housings 72 define air chambers 74 to render the housings 28 buoyant, lower portions of the housings 28 including water inlet openings 76 designed to admit water into the housings 28 externally of the housings 72 to establish a predetermined floating level of the housings 28 in the body of water 10 (see FIG. 9). In addition, the lower portion of each housing 28 may be provided with a weight structure 80 and each inner housing 72 is provided with a sump pump including an outlet 82 opening outwardly of the inner housing 72 and through the corresponding housing 28. The outlets 82 may be conveniently communicated with ship borne initial storage tanks 84 or initial shore tanks 86 from which collected oil and water may be subsequently pumped to a barge type storage vessel 88 or land based storage tanks 90 (see FIG. 1). Of course, the ships or boats 18 and 20 may be anchored in position, if desired.

From a comparison of FIGS. 5 and 6 it may seen that the lower portions of the sealed inner peripheries 38 of the members 34 and 36 define weir flanges extending transversely of the interior of the tubular member 16 and that these weir flanges control, to a great extent, collected water and oil flow longitudinally of the tubular member 16 in the event that the tubular member 16 extends at an angle relative to wave crests. Thus, once oil and water has entered into the interior of the corral 14 through the openings 50, little collected oil and water is spilled back out of the corral 14 as a result of wave action thereon when the wave crests are disposed at an angle relative to the longitudinal extent of the tubular member 16.

As herein before set forth, the various springs 42 tend to inflate the members 34 and 36 prior to the members 34 and 36 being unloaded from a ship onto the body of water 10. However, when the corral 14 is retrieved from the water, individual tubular member elements 58 and sections 26 may be longitudinally compressed to the state thereof illustrated in FIG. 11 for compact storage thereof. Of course, as the tubular member elements 58 and sections 26 are longitudinally compressed, any water and air within the hollow peripheries thereof will be expelled therefrom through the openings 46. Furthermore, by providing the individual members 34 and 36 with the aforementioned springs 42, deleterious effects of wave action on the corral 14 are greatly minimized, inasmuch as each section 26 of the corral 14 may longitudinally contract or expand as a result of wave action thereon. Further, the springs 42 also tend to automatically expand the sections 26 toward their operative positions and to maintain each of the tubular member elements 58 in substantially the same lengthwise expanded condition.

It is pointed out that the weight bars 48 may be varied as to their weight value and, accordingly, the floating level of the corral 14 may be adjusted relative to the oil slick level 52 to compensate for very salty, less salty and fresh water operating conditions. Still further, the openings 50 are defined between opposing vertical portions of adjacent members 34 spaced apart longitudinally of the corresponding tubular member elements 58 and such opposing portions define flared outer portions of the openings 50 which tend to concentrate the proportion of oil to water entering the openings 50.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A oil spill corral including an elongated, horizontal and flexible tubular member for extending at least partially about and containing, against further dispersion, an oil spill area on a body of water, said corral defining opposite inner and outer longitudinal sides for opposing and facing away from, respectively, said oil spill area and including buoyant means operative to float said corral in a partial submerged condition on said body of water, said inner longitudinal side of said tubular member including longitudinally spaced surface water and oil entrance openings therein opening into the interior of said tubular member for the entrance of at least the upper surface layer of water and oil floating thereon into the interior of said tubular member at a level spaced above the lower surfaces of the interior thereof, oil collection locations spaced along said tubular member including means for withdrawing collected oil and water from therewithin for conveyance to a location remote from said tubular member, said tubular member being accordion pleated for compact storage in a collapsed state and deployment in an expanded state, said accordion pleated tubular member including axially collapsible and expandable peripherally continuous hollow segments and axially collapsible and expandable generally G-shaped hollow segments, each of said G-shaped segments opening horizontally outwardly of said inner longitudinal side of said tubular member and defining, by the broken periphery thereof one of said openings, said segments being joined together in side-by-side relation for form said elongated member and said peripherally continuous and G-shaped segments being alternately disposed along said tubular member.

2. The oil spill corral of claim 1 wherein said oil collection locations include sump portions carried by said tubular member.

3. The oil spill corral of claim 2 wherein said elongated tubular member includes a plurality of elongated tubular member sections removably joined together in end aligned and interior communicating relation.

4. The oil spill corral of claim 3 wherein said sump portions include hollow housings serially connected in said elongated tubular member, each between adjacent ends of adjacent tubular member sections.

5. The oil spill corral of claim 1 wherein each of said segments includes means defining a generally horizontal transverse weir flange extending transversely of the interior of said tubular member and spaced below the lower most extremities of the adjacent surface water and oil entrance openings to thereby control the flow of collected water and oil along said tubular member.

6. The oil spill corral of claim 5 wherein each of said hollow segments include internal biasing means biasing said segments toward expanded positions.

7. The oil spill corral of claim 6 wherein each of said hollow segments defines a separate closed inflation chamber and is constructed of flexible air impervious material, said segments each also including lower drain openings and upper check valve equipped air inlet openings, said biasing means serving to bias said chambers toward inflated conditions.

8. The oil spill corral of claim 1, wherein said tubular member is generally rectangular in transverse section.

9. A oil spill corral including an elongated, horizontal and flexible tubular member for extending at least partially about and containing, against further dispersion, an oil spill area on a body of water, said corral defining opposite inner and outer longitudinal sides for opposing and facing away from, respectively, said oil spill area and including buoyant means operative to float said corral in a partially submerged condition on said body of water, said inner longitudinal side of said tubular member including longitudinally spaced surface water and oil entrance openings therein opening into the interior of said tubular member for the entrance of at least the upper surface layer of water and oil floating thereon into the interior of said tubular member at a level spaced above the lower surfaces of the interior thereof, oil collection locations spaced along said tubular member including means for withdrawing collected oil and water from therewithin for conveyance to a locating remote from said tubular member, said tubular member being accordion pleated for compact storage in a collapsed state and deployment in an expanded state, said according pleated tubular member including a generally horizontal and transversely flat lower periphery to resist rolling movement of said tubular member about its longitudinal axis relative to the body of water upon which said tubular member is floating, said accordion pleated tubular member including axially collapsible and expandable peripherally continuous hollow segments and axially collapsible and expandable generally G-shaped hollow segments, each of said G-shaped segments opening horizontally outwardly of said inner longitudinal side of said tubular member and defining, by the broken periphery thereof one of said openings, said segments being joined together in side-by-side relation to form said elongated member and said peripherally continuous and G-shaped segments being alternately disposed along said tubular member.

10. The oil spill corral of claim 9 wherein each of said segments includes means defining a generally horizontal transverse weir flange extending transversely of the interior of said tubular member and spaced below the lower most extremities of the adjacent surface water and oil entrance openings to thereby control the flow of collected water and oil along said tubular member.

11. The oil spill corral of claim 10 wherein each of said hollow segments include internal biasing means biasing said segments toward expanded positions.

12. The oil spill corral of claim 11 wherein each of said hollow segments defines a separate closed inflation chamber and is constructed of flexible air impervious material, said segments each also including lower drain openings and upper check valve equipped air inlet openings, said biasing means serving to bias said chambers toward inflated conditions.

13. The oil spill corral of claim 12 wherein said outer longitudinal side of said tubular member includes longitudinally spaced anchor means whereby a tether and positioning line may extend along and be anchored to said longitudinal inner side at points spaced longitudinally therealong.

14. An oil spill corral including an elongated, horizontal and flexible tubular member for extending at least partially about and containing, against further dispersion, an oil spill area on a body of water, said corral defining opposite inner and outer longitudinal sides for opposing and facing away from, respectively, said oil spill area and including buoyant means operative to float said corral in a partially submerged condition on said body of water, said inner longitudinal side of said tubular member including longitudinally spaced surface water and oil entrance openings therein opening into the interior of said tubular member for the entrance of at least the upper surface layer of water and oil floating thereon into the interior of said tubular member at a level spaced above the lower surface of the interior thereof, oil collection locations spaced along said tubular member including means for withdrawing collected oil and water from therewithin for conveyance to a location remote from said tubular member, said tubular member being accordion pleated such that said inner longitudinal side defines horizontally outwardly divergent, generally partial cylindrical and vertically extending surfaces defining the limits of each of said openings spaced longitudinally of said tubular member and extending throughout the vertical extend of each opening.

* * * * *